2,954,362
Patented Sept. 27, 1960

2,954,362
STABILIZED VINYL CHLORIDE RESIN COMPOSITIONS

Joseph E. Wilson, Highland Park, N.J., assignor to Union Carbide Corporation, a corporation of New York
No Drawing. Filed June 11, 1956, Ser. No. 590,794
16 Claims. (Cl. 260—45.75)

This invention relates to polymeric compositions. In one of its more particular aspects this invention relates to stabilizers for vinyl resins.

The resins commonly known as vinyl resins and particularly those vinyl resins which comprise homopolymers and copolymers of vinyl chloride and other ethylenically unsaturated monomers copolymerizable therewith have found wide application in a number of fields. These applications include use as films, rigid and flexible sheets, fibers, coatings, molded and extruded articles, adhesives, and the like.

It is well known that in the preparation and processing of vinyl resins it is necessary to utlize elevated temperatures. At such elevated temperatures vinyl resins are subject to a certain amount of decomposition resulting in discoloration accompanied by adverse changes in strength, elasticity and electrical characteristics.

In the case of vinyl resins containing chlorine, such as homopolymers and copolymers of vinyl chloride, liberation of hydrogen chloride is observed when such resins are subjected to heat. This hydrogen chloride liberation, which can occur during high temperature processing and fabricating operations, such as roll milling, extrusion or molding or upon exposure to elevated temperatures during use, is particularly undesirable in that hydrogen chloride may attack processing equipment or cause premature failure of parts coated with these resins.

The problem of hydrogen chloride evolution has been partially solved by the discovery that certain additives which can combine with hydrogen chloride, such as alkaline metal salts, organotin compounds and epoxy compounds, so-called primary stabilizers, are effective to minimize polymer decomposition.

Some decomposition, however, as evidenced by color development in the resins occurring in the presence of these primary stabilizers, remains unchecked. This further decomposition may be due to oxidative processes or may simply be a further chemical breakdown resulting from heating.

Stabilizers suggested to minimize this so-called secondary decomposition, such as certain mercaptan derivatives, while partially effective for this purpose, have been found to impart strong and extremely objectionable odors to the polymers and are therefore not generally acceptable.

It is accordingly an object of this invention to provide stabilizers for vinyl resins which do not impart objectionable odors to the resins.

Another object of this invention is to provide vinyl resin stabilizers which are effective in combatting secondary decomposition of vinyl resins.

Another object of this invention is to provide novel stabilized vinyl resin compositions.

A further object of this invention is to provide stabilizers which may be used with known primary stabilizers to give enhanced results.

Other objects and advantages of this invention will appear in the course of the following detailed description and disclosure.

In accordance with the above-listed objects of the instant invention, it has been found that mercapto-substituted aliphatic polybasic acids and polyesters formed from the reaction of these acids with polyhydric alcohols are effective to prevent or minimize secondary decomposition of vinyl resins of various types.

Acids which may be used to stabilize vinyl resins in accordance with this invention include thiomalic acid, HOOC—CH(SH)—CH$_2$—COOH, and higher homologues thereof, such as mercaptoglutaric acid and mercaptoadipic acid. Any mono- or poly-mercapto polycarboxylic acid containing from about 3 to 16 carbon atoms may be employed.

In addition to these mercapto-acids, various nonvolatile derivatives thereof, prepared by reactions involving the carboxyl group of the acid may also be used in the stabilization of vinyl resins. Of particular importance are polyesters prepared by reaction of the acids with glycols, such as ethylene glycol and propylene glycol.

These polyesters are compounds in which the mercapto group is present in that part of the molecule derived from the acid. They may be prepared by reacting stoichiometric proportions of acid and polyhiydric alcohol in the presence of an esterification catalyst. For example, the reaction between thiomalic acid and ethylene glycol may be represented by the following equation:

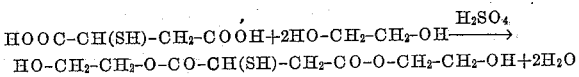

HOOC-CH(SH)-CH$_2$-COOH+2HO-CH$_2$-CH$_2$-OH $\xrightarrow{H_2SO_4}$

HO-CH$_2$-CH$_2$-O-CO-CH(SH)-CH$_2$-CO-O-CH$_2$-CH$_2$-OH+2H$_2$O

The vinyl resins which may be stabilized by use of this invention include polymers of ethylenically unsaturated polymerizable compounds, in general, but more particularly polymers of vinyl chloride. Both homopolymers of vinyl chloride and copolymers thereof, preferably containing at least about 10% by weight of polymerized vinyl chloride, are included. Sutiable comonomers include vinyl esters, such as vinyl acetate, vinyl butyrate and vinyl benzoate; vinyl ethers, such as vinyl ethyl ether, vinyl chloroethyl ether, and vinyl phenyl ether; vinyl ketones, such as vinyl methyl ketone, and vinyl phenyl ketone; vinylidene halides, such as vinylidene chloride, 1-fluoro-1-chloroethylene; acrylic compounds, such as acrylonitrile, chloroacrylonitrile, methyl acrylate, methyl methacrylate and 2-ethylhexyl acrylate; allyl compounds, such as allylidene diacetate and chloroallylidene diacetate; and the like.

The stabilizers of the instant invention may be incorporated into the vinyl resin compositions, which may contain plasticizers, fillers, pigments, dyes, ultraviolet absorbing agents, densifying agents, and other additives in addition to the resins, by admixing in an appropriate mill or mixer or by any of the well known methods which provide for uniform distribution throughout the resin compositions.

These stabilizers may be advantageously employed in concentrations of as little as about 0.01% by weight of the resin or as much as about 10%. Ordinarily, however, concentrations of from about 0.01% to 5% are preferred for reasons of economy; greater concentrations providing relatively little additional benefit.

In carrying out my invention the stabilizers of this invention are used in combination with acid-accepting primary stabilizers. The latter include organotin compounds, such as dibutyl tin dilaurate, dibutyl tin maleate and dibutyl tin laurate maleate; alkaline metal salts, such as sodium carbonate, trimagnesium phosphate and calcium stearate; epoxy compounds, such as glycidyl oleate, diglycidyl ethers of diphenols, and glycidyl sorbate dimer; and the like. It is not recommended that the stabilizers of this invention be used in combination with organo-lead compounds or other compounds capable of reacting with them to give dark colored products.

The secondary stabilizers should be employed with primary stabilizers with which they are color-compatible, i.e., no dark colored products are formed. The term "color-compatible" in the claims is intended to refer to primary stabilizers which are color-compatible, as aforesaid, with the secondary stabilizers herein.

The combination of the mercapto acids and mercapto esters of this invention with primary stabilizers results in more effective stabilization of chlorine-containing vinyl resins than would be expected as the additive effect of the combination. Thus a synergistic effect is actually observed when both types of stabilizers are used. Accordingly, the incorporation of combinations of the stabilizers of this invention and primary stabilizers into chlorine-containing vinyl resins comprises the instant invention.

The use of the stabilizers of the present invention is further illustrated in the following examples, in which all parts are by weight.

*Example I*

The following formulations were fluxed and fabricated into sheets 0.040 inch thick by milling for 10 minutes at a temperature of 170° C. on a two-roll differential speed mill. Sample A contained no secondary stabilizer and was intended as a control.

| | Sample A, parts | Sample B, parts |
|---|---|---|
| vinyl chloride homopolymer [1] | 100.0 | 100.0 |
| dioctyl phthalate | 40.0 | 40.0 |
| stearic acid | 0.5 | 0.5 |
| dibutyl tin dilaurate | 2.0 | 2.0 |
| thiomalic acid | 0.0 | 0.2 |
| | 142.5 | 142.7 |

[1] This is a non-solvent polyvinyl chloride resin sold commercially by Union Carbide and Carbon Corporation under the designation "QYNA" resin.

Discs, 1.5 inches in diameter, were cut from samples A and B and placed in an air oven for 6 hours at 158° C. One disc of each sample was withdrawn from the oven periodically and blue light reflectance was measured. Decrease in blue light reflectance provides a reliable index of the amount of discoloration. The percent blue light reflectance for each sample was measured with a photometer adjusted to read 100 percent reflectance for a white block of magnesium oxide. The percent of blue light reflectance after heating was as follows:

| Hours in 158° C. Oven | Percent Reflectance | |
|---|---|---|
| | Sample A | Sample B |
| 0.0 | 77 | 79 |
| 1.0 | 66 | 75 |
| 2.0 | 55 | 71 |
| 3.0 | 7 | 68 |
| 4.0 | 0 | 61 |
| 5.0 | 0 | 53 |
| 6.0 | 0 | 51 |

In terms of appearance, control sample A had turned almost black and opaque after 3 hours, while sample B was yet a transparent material having a faint straw color. Even after 6 hours at 158° C. in the oven, sample B had only a light yellow color and was transparent.

*Example II*

Samples C and D were formulated as shown and prepared as described in Example I. Sample C was the control.

| | Sample C, parts | Sample D, parts |
|---|---|---|
| copolymer of vinyl chloride and vinyl acetate [1] | 100.0 | 100.0 |
| dioctyl phthalate | 40.0 | 40.0 |
| dibutyl tin dilaurate | 2.0 | 2.0 |
| stearic acid | 0.5 | 0.5 |
| thiomalic acid | 0.0 | 0.2 |
| | 142.5 | 142.7 |

[1] The copolymer employed is sold commercially by Union Carbide and Carbon Corporation as "VYNW" resin and contains about 96 parts of vinyl chloride and about 4 parts of vinyl acetate.

The percent of blue light reflectance after heating in a 158° C. oven was as follows:

| Hours | Percent Reflectance | |
|---|---|---|
| | Sample C | Sample D |
| 0.0 | 80 | 83 |
| 0.5 | 79 | 81 |
| 1.0 | 76 | 78 |
| 1.5 | 66 | 72 |
| 2.0 | 48 | 67 |
| 2.5 | 10 | 53 |

In terms of appearance, control sample C without thiomalic acid had become chocolate-brown and opaque after 2.5 hours. The corresponding sample D, containing thiomalic acid, was light yellow.

*Example III*

Samples E and F were milled into sheets as described in Example I.

| | Sample E, parts | Sample F, parts |
|---|---|---|
| copolymer of vinyl chloride and 2-ethylhexyl acrylate [1] | 25 | 25 |
| vinyl chloride homopolymer [2] | 75 | 75 |
| dibutyl tin laurate maleate | 3 | 3 |
| stearic acid | 0.75 | 0.75 |
| thiomalic acid | 0.0 | 0.2 |
| | 103.75 | 103.95 |

[1] This is a copolymer containing about 80 parts of vinyl chloride and about 20 parts of 2-ethylhexyl acrylate.
[2] This is a suspension type polyvinyl chloride resin sold commercially by Union Carbide and Carbon Corporation under the designation "QYSQ."

The percent of blue light reflectance after heating at 158° C. in air was as follows:

| Hours | Percent Reflectance | |
|---|---|---|
| | Sample E | Sample F |
| 0.0 | 65 | 74 |
| 0.5 | 65 | 71 |
| 1.0 | 58 | 68 |
| 1.5 | 43 | 60 |
| 2.0 | 37 | 58 |
| 2.5 | 34 | 45 |
| 3.0 | 38 | 40 |
| 3.5 | 34 | 38 |
| 4.0 | 10 | 35 |

*Example IV*

The samples of Example III were subjected to a milling stability test at 170° C. on a differential speed mill. Every ten minutes samples 0.040 inch thick were removed from the mill and blue light reflectance measured. Results were as follows:

| Minutes | Percent Reflectance | |
|---|---|---|
| | Sample E | Sample F |
| 0 | 70 | 72 |
| 10 | 67 | 73 |
| 20 | 65 | 70 |
| 30 | 57 | 68 |

The sample containing the secondary stabilizer shows consistently better color than the control throughout the entire milling operation.

*Example V*

A polyester was prepared from thiomalic acid and ethylene glycol. A mixture of 1 mole of thiomalic acid and 2 moles of ethylene glycol was reacted in dioxane/benzene (3:1) solvent containing a small amount of concentrated hydrochloric acid (ca. 1% HCl) as an esterification catalyst. The reactants were gently refluxed and a mixture of benzene and water was separated by distillation. The reaction was carried approximately two-thirds of the way to completion as indicated by the amount of water formed. The polyester was a yellow-brown viscous liquid. It was purified by washing successively with distilled water, amyl alcohol, and diethyl ether.

The following samples were formulated, fluxed on the mill, and formed into sheets as in Example I:

|  | Sample G | Sample H |
|---|---|---|
| vinyl chloride homopolymer (QYNA resin) | 100.0 | 100.0 |
| dioctyl phthalate | 40.0 | 40.0 |
| stearic acid | 0.5 | 0.5 |
| dibutyl tin dilaurate | 2.0 | 2.0 |
| polyester | 0.0 | 0.2 |
|  | 142.5 | 142.7 |

These samples were aged in an air oven at 158° C. and reflectance values measured at one-half hour intervals.

| Hours | Percent Reflectance | |
|---|---|---|
|  | Sample G | Sample H |
| 0.0 | 77 | 78 |
| 0.5 | 71 | 76 |
| 1.0 | 66 | 76 |
| 1.5 | 62 | 73 |
| 2.0 | 55 | 67 |
| 2.5 | 41 | 60 |
| 3.0 | 7 | 48 |

After 3 hours the control had turned dark brown and opaque while the sample containing the polyester was a transparent light yellow.

It can be readily seen from the foregoing examples that the addition of mercapto-substituted aliphatic polybasic acids and condensation products of these acids and polyhydric alcohols to chlorine-containing vinyl resins serves to reduce decomposition and discoloration of these resins due to heat, oxidation, or other causes. Each of the samples containing the secondary stabilizers of this invention was tested for objectionable odors, but none was discerned in any instance.

This invention is not restricted to any of the particular compositions disclosed, but is broadly useful in stabilizing resin compositions containing a variety of constituents. Other plasticizers than dioctyl phthalate, for example, may be used without departing from the scope of this invention, which is limited only by the appended claims.

I claim:

1. A composition which comprises a material selected from the group consisting of vinyl chloride homopolymers and copolymers of vinyl chloride with another ethylenically unsaturated monomer comprising at least 10% by weight of vinyl chloride polymerized therein, selected from the group consisting of dibutyl tin dilaurate, dibutyl tin maleate, dibutyl tin laurate maleate, sodium carbonate, trimagnesium phosphate, calcium stearate, glycidyl oleate, diglycidyl ethers of diphenols, and glycidyl sorbate dimer and a second stabilizer selected from the group consisting of mercapto-substituted aliphatic saturated polycarboxylic acid containing from about 3 to 16 carbon atoms and condensation products of said acids and dihydric alcohols in a minor proportion effective to improve the resistance of the vinyl material to decomposition and discoloration normally occurring at elevated temperatures, said stabilizers each being present in the resin as such and in admixture with the vinyl material.

2. The composition of claim 1, wherein the second stabilizer is present in an amount of from about 0.01% to 5% by weight of the resin.

3. The composition of claim 1, wherein the second stabilizer is thiomalic acid.

4. The composition of claim 1, wherein the second stabilizer is a condensation product of thiomalic acid and ethylene glycol.

5. A composition which comprises a vinyl chloride resin, said resin containing from about 10% to 100% of polymerized vinyl chloride, selected from the group consisting of dibutyl tin dilaurate, dibutyl tin maleate, dibutyl tin laurate maleate, sodium carbonate, trimagnesium phosphate, calcium stearate, glycidyl oleate, diglycidyl ethers of diphenols, and glycidyl sorbate dimer, and from about 0.01% to 5% by weight of the resin of a second stabilizer selected from the group consisting of mercapto-substituted aliphatic saturated polycarboxylic acid containing from about 3 to 16 carbon atoms and condensation products of said acids and dihydric alcohols, said stabilizers each being present in the resin as such and in admixture with the vinyl material.

6. A composition which comprises polymerized vinyl chloride, selected from the group consisting of dibutyl tin dilaurate, dibutyl tin maleate, dibutyl tin laurate maleate, sodium carbonate, trimagnesium phosphate, calicuim stearate, glycidyl oleate, diglycidyl ethers of diphenols, and glycidyl sorbate dimer and from about 0.01% to 5% by weight of the polymer of a second stabilizer selected from the group consisting of thiomalic acid and condensation products of thiomalic acid and ethylene glycol, said stabilizers each being present in the resin as such and in admixture with the vinyl material.

7. A composition which comprises a copolymer of vinyl chloride and an ethylenically unsaturated compound copolymerizable therewith, said copolymer containing at least about 10% of polymerized vinyl chloride, selected from the group consisting of dibutyl tin dilaurate, dibutyl tin maleate, dibutyl tin laurate maleate, sodium carbonate, trimagnesium phosphate, calcium stearate, glycidyl oleate, diglycidyl ethers of diphenols, and glycidyl sorbate dimer and from about 0.01% to 5% by weight of the copolymer of a second stabilizer selected from the group consisting of mercapto-substituted aliphatic saturated polycarboxylic acid containing from about 3 to 16 carbon atoms and condensation products of said acids and dihydric alcohols, said stabilizers each being present in the resin as such and in admixture with the vinyl material.

8. The composition of claim 7, wherein the ethylenically unsaturated compound is vinyl acetate and the second stabilizer is thiomalic acid.

9. The composition of claim 7, wherein the ethylenically unsaturated compound is octyl acrylate and the second stabilizer is thiomalic acid.

10. A composition which comprises a material selected from the group consisting of vinyl chloride homopolymers and copolymers of vinyl chloride with another ethylenically unsaturated monomer comprising at least 10% by weight of vinyl chloride polymerized therein, stabilized with a member selected from the group consisting of dibutyl tin dilaurate, dibutyl tin maleate, dibutyl tin maleate laurate, sodium carbonate, trimagnesium phosphate, calcium stearate, glycidyl oleate, diglycidyl ethers of diphenols and glycidyl sorbate dimer against decomposition caused by the liberation of hydrogen chloride from said vinyl material, and from about 0.01% to 5% by weight of said vinyl material, of a compound selected from the group consisting of mercapto-substituted aliphatic saturated polycarboxylic acid containing from about 3 to 16 carbon atoms and condensation products of said acids and dihydric alcohols, the mercapto-compound being present as such and in admixture with the vinyl material.

11. A composition which comprises a homopolymer of vinyl chloride, a primary stabilizer selected from the group consisting of dibutyl tin dilaurate, dibutyl tin maleate, dibutyl tin maleate laurate, sodium carbonate, trimagnesium phosphate, calcium stearate, glycidyl oleate, diglycidyl ethers of diphenols and glycidyl sorbate dimer, and a second stabilizer, in a minor proportion effective to improve the resistance of the vinyl chloride to decomposition and discoloration normally occurring at elevated temperatures, selected from the group consisting of mercapto-substituted aliphatic saturated polycarboxylic acid containing from about 3 to 16 carbon atoms and condensation products of said acids and dihydric alcohols, said stabilizers each being present in the resin as such and in admixture with the vinyl material.

12. The composition of claim 11, wherein the primary stabilizer is dibutyl tin dilaurate, and the second stabilizer is thiomalic acid, the latter being present in a concentration of from about 0.01% to 5% by weight of the vinyl chloride homopolymer.

13. The composition of claim 11, wherein the primary stabilizer is dibutyl tin dilaurate, and the second stabilizer is a condensation product of thiomalic acid and ethylene glycol, said condensation product being present in a concentration of from about 0.01% to 5% by weight of the vinyl chloride homopolymer.

14. A composition which comprises a copolymer of vinyl chloride and an ethylenically unsaturated compound copolymerizable therewith, said copolymer containing at least about 10% of polymerized vinyl chloride, a primary stabilizer selected from the group consisting of dibutyl tin dilaurate, dibutyl tin maleate, dibutyl tin maleate laurate, sodium carbonate, trimagnesium phosphate, calcium stearate, glycidyl oleate, diglycidyl ethers of diphenols and glycidyl sorbate dimer effective to stabilize said copolymer against decomposition by evolution of hydrogen chloride, and a second stabilizer, selected from the group consisting of mercapto-substituted aliphatic saturated polycarboxylic acid containing from about 3 to 16 carbon atoms and condensation products of said acids and dihydric alcohols, in a minor proportion effective to improve the resistance of the vinyl chloride to decomposition and discoloration normally occurring at elevated temperatures, said stabilizers each being present in the resin as such and in admixture with the vinyl material.

15. The composition of claim 14, wherein the ethylenically unsaturated compound is vinyl acetate, the primary stabilizer is dibutyl tin dilaurate, and the second stabilizer is thiomalic acid, the latter being present in a concentration of from about 0.01% to 5% by weight of the copolymer.

16. The composition of claim 14, wherein the ethylenically unsaturated compound is octyl acrylate, the primary stabilizer is dibutyl tin laurate maleate, and the second stabilizer is thiomalic acid, the latter being present in a concentration of from about 0.01% to 5% by weight of the copolymer.

References Cited in the file of this patent

UNITED STATES PATENTS

| | | |
|---|---|---|
| 2,439,677 | Shapiro | Apr. 13, 1948 |
| 2,449,418 | Sharkey | Sept. 14, 1948 |
| 2,461,920 | Pratt | Feb. 15, 1949 |
| 2,641,588 | Leistner et al. | June 9, 1953 |
| 2,648,650 | Weinberg et al. | Aug. 11, 1953 |
| 2,657,983 | Hill et al. | Nov. 3, 1953 |
| 2,666,752 | Grummit et al. | Jan. 19, 1954 |
| 2,680,726 | Weinberg et al. | June 8, 1954 |
| 2,707,178 | Wilson | Apr. 26, 1955 |
| 2,745,821 | Stanton et al. | May 15, 1956 |
| 2,809,956 | Mack et al. | Oct. 15, 1957 |

OTHER REFERENCES

Chem. Abstracts, vol. 45, 1951, columns 9289–9294.

UNITED STATES PATENT OFFICE
CERTIFICATION OF CORRECTION

Patent No. 2,954,362                          September 27, 1960

Joseph E. Wilson

It is hereby certified that error appears in the above numbered patent requiring correction and that the said Letters Patent should read as corrected below.

Column 5, line 59, and column 6, lines 8, 21, and 36, before "selected", each occurrence, insert -- a stabilizer capable of combining with hydrogen chloride --; column 7, line 5, after "chloride" insert -- homopolymer --; column 8, lines 2 and 3, after "chloride" insert -- copolymer --.

Signed and sealed this 23rd day of May 1961.

(SEAL)
Attest:

ERNEST W. SWIDER                          DAVID L. LADD
Attesting Officer                           Commissioner of Patents